Figure 1:
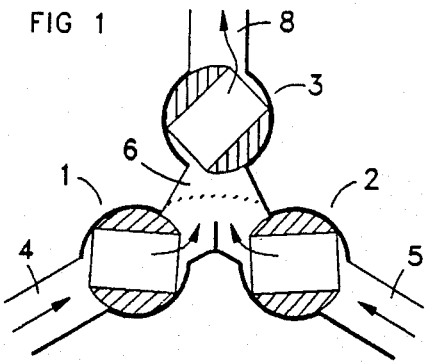

United States Patent [19]

Stewart

[11] Patent Number: 4,949,753
[45] Date of Patent: Aug. 21, 1990

[54] FLUID MIXTURE AND FLOW CONTROL VALVE

[76] Inventor: John V. Stewart, 1308 Henry Balch Dr., Orlando, Fla. 32810

[21] Appl. No.: 364,645

[22] Filed: Jun. 12, 1989

[51] Int. Cl.⁵ .................. F16K 11/085; F16K 11/087; F16K 11/22
[52] U.S. Cl. .................................... 137/607; 137/605; 137/864
[58] Field of Search ............ 137/607, 606, 605, 637.3, 137/864

[56] References Cited

U.S. PATENT DOCUMENTS

| | | |
|---|---|---|
| 1,231,305 | 6/1917 | Shepherd ............................ 137/607 |
| 1,641,560 | 9/1927 | Whidden ............................ 137/607 |
| 1,641,561 | 9/1927 | Whidden ............................ 137/607 |
| 1,787,304 | 12/1930 | Becker .............................. 236/12.17 |
| 2,017,194 | 10/1935 | Zimmerman ...................... 236/12.17 |
| 2,038,943 | 4/1936 | La Fountain ...................... 137/607 |
| 2,069,040 | 1/1937 | Lodder ............................. 236/12.17 |
| 2,146,929 | 2/1939 | Bassett, Jr. ....................... 236/12.17 |
| 2,494,044 | 1/1950 | Jurisich et al. .................... 236/12.17 |
| 2,546,423 | 3/1951 | Bentsen ............................ 236/12.17 |
| 2,828,768 | 4/1958 | Adams .............................. 137/607 |
| 3,034,725 | 5/1962 | Person .............................. 137/607 |
| 3,303,970 | 2/1967 | Breslau et al. ..................... 137/607 |
| 3,701,364 | 10/1972 | Hare ................................. 137/625.41 |
| 3,746,048 | 7/1973 | Harper .............................. 137/607 |
| 3,905,582 | 9/1975 | Fiorentini ......................... 137/607 |
| 4,349,149 | 9/1982 | Humpert ........................... 236/12.16 |
| 4,685,156 | 8/1987 | Brabazon ........................... 137/597 |
| 4,711,393 | 12/1987 | Lee .................................. 137/607 |

FOREIGN PATENT DOCUMENTS 2802377 7/1979 Fed. Rep. of Germany ... 236/12.17

*Primary Examiner*—John Rivell
*Assistant Examiner*—L. R. Leo

[57] ABSTRACT

A device for fluid mixing and flow control in showers, baths, and sinks. Three flow control valves are connected to a mixing chamber. Two of the valves control two inlet channels into the chamber, and the third valve controls the flow out of the chamber. The two inlet valves are linked to operate in unison in opposite phase (one opens when the other closes), providing a variable fluid mixing ratio. The complementary operation of these mixing valves causes their combined flow rate to remain constant while the mixing ratio varies. The third valve controls the total flow rate. This provides independent control of mixture and flow via a simple device. A circular dial can show the control arm positions clearly, allowing quick, absolute adjustment.

10 Claims, 3 Drawing Sheets

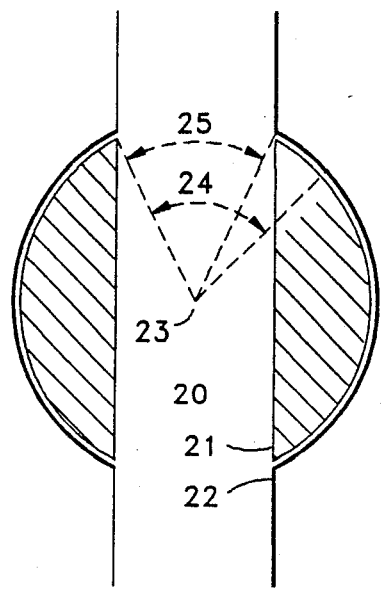
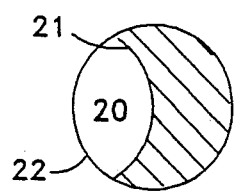
FIG 12
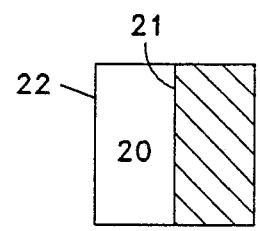
FIG 13
FIG 11

FLUID MIXTURE AND FLOW CONTROL VALVE

BACKGOUND

1. Field of Invention

This invention relates to valves for adjustable mixing of fluids, especially thermal mixing of water for baths, showers, and sinks.

2. Prior Art

There are many types of water mixing valves for baths, showers, and sinks. The most common arrangement has separate flow valves for hot and cold water, the two flows being combined downstream of the valves. The user must adjust both valves iteratively to arrive at a desired combination of temperature and flow rate. This is incovenient and time consuming. The iterative process must be repeated for each change of temperature or flow, discouraging a change of flow rate during showers to save water.

Another type of mixing valve, commonly found in kitchen sinks, has a single lever which controls both mixture and flow. These controls have no reference points, so trial and error is used to find a desired position in the spherical range of the control handle. The exact full hot position is not knwon, so cold water is wasted while waiting for hot water to arrive. These valves are notorious leakers due to the complex stresses on the seals from three-dimensional motion of the handle. It is difficult to adjust the flow rate and mixture independently since it requires guiding the control through a precise arc with no reference points.

A shower valve often found in hotels has a single control handle for the mixture adjustment, but only offers flow that is fully on or off. Adjustment is simplified by the lack of graduated flow control, but the tradeoff is waste from excessive flow. People do not choose such valves for their homes, preferring a full range of flow rates, from low for economy to high for rinsing and scalp massage.

An auxiliary flow valve can be installed downstream of the water mixing point to provide independent control of the total flow rate. Such a valve is available in some shower heads for temporary shutoff. However, shower heads are generally not adequately leakproof to provide a primary shutoff, so the mixture valve are used for final shutoff, and must be readjusted for each shower.

Time and water is wasted during the adjustment period of shower valves that require iterative adjustment. The total waste is substantial, since this activity is performed every day by many people. As a ballpark figure, assume 100,000,000 baths or showers a day are taken in the U.S., with about 20 seconds and 1 gallon of water wasted during iterative adjustment, and another gallon wasted due to the incovenience of changing the flow rate for economy during the shower. This computes to 200 million man hours and 70 billion gallons of water per year in the U.S. alone. This invention offers savings in both of these categories, although its main claimed benefit is user convenience.

OBJECTS AND ADVANTAGES

The object of this invention is to meet the following criteria for water control in showers, baths, and sinks:
1. Control mixture and flow rate independently
2. Convenient, clear controls with absolute positioning marks
3. Practical, inexpensive manufacture
4. Standard plumbing installation
5. Reliability and longevity As will be seen from the description, all of these criteria are met in the present invention.

DRAWING FIGURES

FIGS. 1-3 and 4-6 are sets. Each set shows a given position of the controls in three views.

FIG. 1—Front section, shown at medium flow, equal mixture

Figure 2:
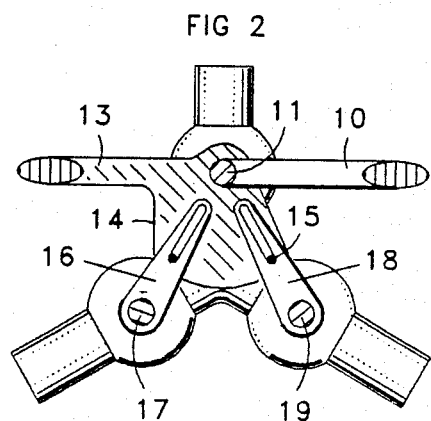

FIG. 2—Front exterior, with linkage type 1, positioned per FIG. 1

Figure 3:
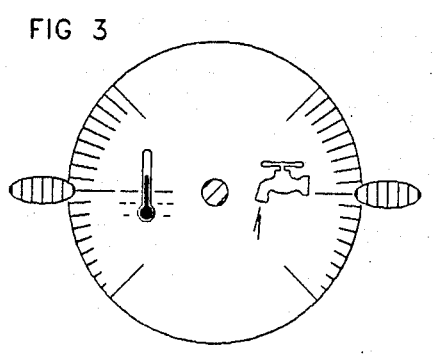

FIG. 3—Dial face, per FIG. 1

Figure 4:
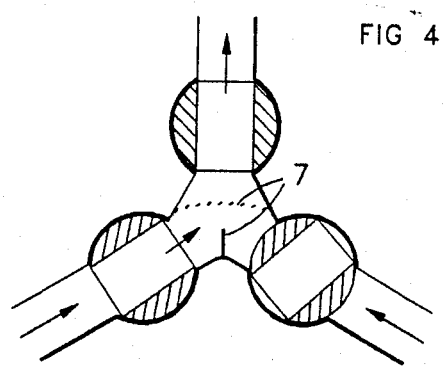

FIG. 4—Frontal section, high flow rate, full hot mixture

Figure 5:
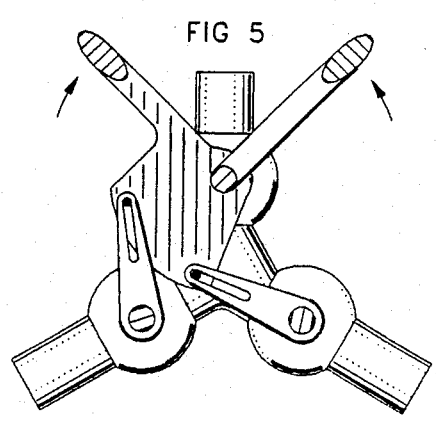

FIG. 5—Front elevation, per FIG. 4

Figure 6:
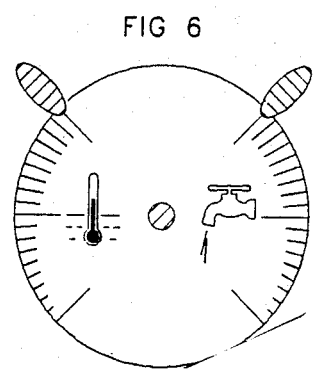

FIG. 6—Dial face, per FIG. 4

Figure 7:
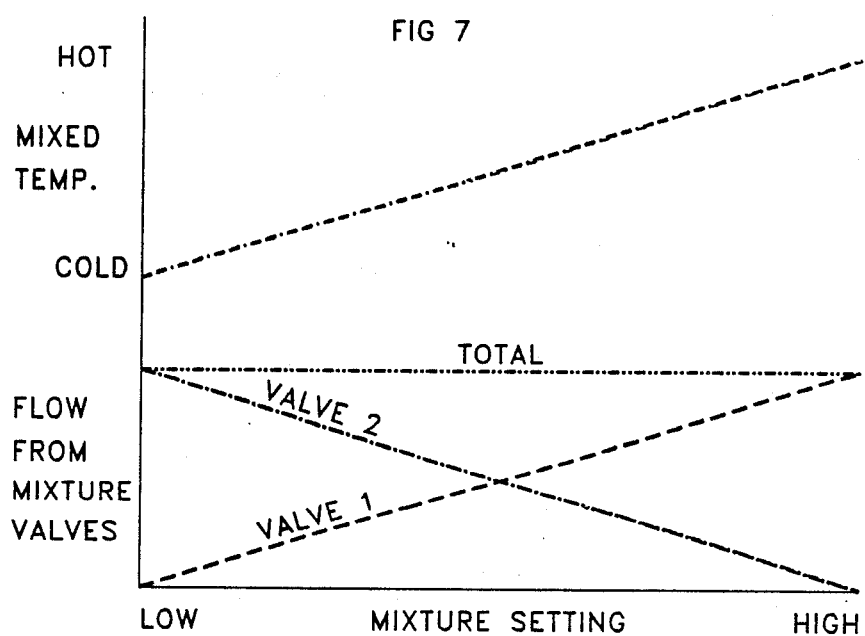

FIG. 7—Flow rates and temperature from mixture valves vs. mixture setting

Figure 8:
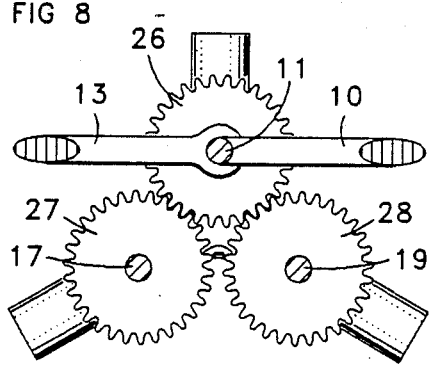

FIG. 8—Linkage type 2, at medium flow, equal mixture

Figure 9:
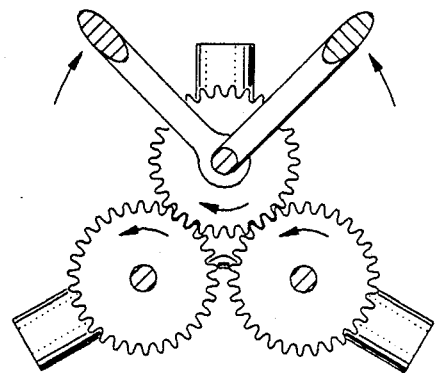

FIG. 9—Linkage type 2, at high flow, hot mixture

Figure 10:
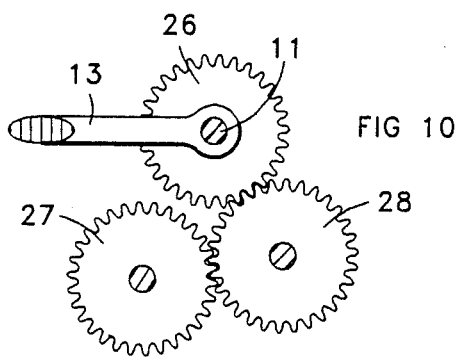

FIG. 10—Aternate gearing for linkage type 2

FIG. 11—Valve design elements

FIG. 12—Valve rotor as seen through valve channel, in half-open position

FIG. 13—Rectangular throat and channel, viewed as in FIG. 11.

DRAWING REFERENCE NUMERALS

1: First flow valve
2: Second flow valve
3: Third flow valve
4: Inlet channel 1 (hot)
5: Inlet channel 2 (cold)
6: Mixing chamber
7: Baffles
8: Outlet
10: Volume control arm
11: Volume control shaft
13: Mixture control arm
14: Mixture linkage arm connected to control arm 13
15: Linkage pin
16: Mixture linkage arm driving valve 1
17: Control shaft of valve 1
18: Mixture linkage arm driving valve 2
19: Control shaft of valve 2
20: Valve throat
21: Inner surface of valve throat
22: Inner surface of valve channel
23: Rotation axis of valve rotor
24: Rotation range including seal overlap
25: Rotation range without seal overlap
26: Mixture linkage gear connected to control arm 13
27: Mixture linkage gear driving valve 1
28: Mixture linkage gear driving valve 2.

DESCRIPTION

The device comprises two inlet valves which operate in unison to control the mixing ratio, and an outlet valve which controls total flow rate. Any type of graduated flow valves can be used, preferably ones with low rotation resistance and about 90 degrees rotation range. The preferred valve type has a spherical or cylindrical rotor with a throat. The throat rotates 90 degrees, into and out of alignment with the flow path. Spherical rotors with o-ring seals are especially suitable because they have low rotation resistance, and require little ovelap between the rotor and its seal.

The drawing figures on sheet 1 are arranged in sets. FIGS. 1-3 show the midpoint setting of the mixture control and flow control. FIGS. 4-6 show the high setting of both controls.

FIG. 1 shows the device in section, as set for equal mixture and medium flow. Inflows 4 and 5 are proportioned by the ratio of the apertures of valves 1 and 2. These two valves are operated in unison by a linkage, which keeps them in opposite phase to each other. Thus, when one valve is open, the other is closed; when one is 25% open, the other is 75% open, etc. This arrangement results in constant total flow rate, since the two inflows always complement each other. This is shown graphically in FIG. 7. Valve 3, downstream from the two mixing valves, controls the outlet flow independently.

Two types of mixture control linkages are shown: the arm type in FIG. 2, and the gear type in FIG. 8. The arm linkage is simpler, since it does not require gears. In FIG. 2, linkage arm 14 is connected to mixture control arm 13, and journaled on shaft 11. Pins 15 on arm 14 engage arms 16 and 18 which operate valves 1 and 2. This linkage reduces the rotation transmitted to the valves. For example, in FIGS. 1-6 the mixture valves receive 76 degrees of rotation from 90 degrees of control arm rotaton. This is a design variable, depending on the relative radius of engagement of the driving and driven links. Valve rotation range must be enough to allow the valves to close, although they need not close to a fully leakproof seal, since valve 3 is the shut-off point. The mixture should be affixed to the linkage so that their measured half-flow position corresponds with the mixture control at its middle position. This insures constant flow rate throughout the mixture adjustment.

Various linkage arrangements are possible. Some examples are:
1. As in FIG. 10, drive gear 26 can engage one mixture valve gear, 16 or 18, which in turn engages the second mixture valve gear, causing the mixture valves to rotate in opposite directions.
2. Valve 3 can be operated via a linkage, rather than directly. This allows locating the axis of the control arms closer to the mixture valves, permitting the use of smaller gears. In this case, a journal is attached to a central position on the valve case.
3. The mixture control arm can be connected directly to one mixture valve, and the other mixture valve operated via a linkage. The flow control arm can be journaled to the shaft of the one mixture valve, and operate valve 3 by a linkage.
4. The mixture and flow control arms need not have the same pivot axis, although it is preferred. The flow control arm can be connected directly to valve 3, and the mixture control arm can be connected directly to one of the mixture valves, operating the other by linkage. This arrangement requires the least number of linkage elements, but offers a less unified appearance to the user.
5. The mixing valves can be positioned to rotate coaxially, and a single shaft can operate both valves.

FIG. 11 clarifies the valve rotation parameters discussed here. Item 25 is the rotation range from fully open (throat 20 aligned with valve channel), to barely closed (the throat edge first contacts the opposite sealing edge). This degree of closure is adequate for the mixing valves, even though slight seepage through a closed valve may occur. Item 24 is the rotation range from fully open to a fully leakproof closed position. This degree of closure is required in valve 3.

FIGS. 12 and 13 show half-open rotors as seen from the valve channel. In FIG. 12 the channel and throat are cylindrical, while in FIG. 13 they are rectagular. A rectangular throat and channel creates an aperture that varies linearly with rotation, offering consistency. The half-flow position thus corresponds with the half-rotation position (in range 25 of FIG. 11), unlike cylindrical throats. Notice that the aperture in FIG. 12 is less than half the full channel, while the aperture in FIG. 13 is exactly half. Both figures are drawn at the halfway position of range 25. To provide a special channel shape, such as rectangular, only that part of the channel adjacent the rotor needs to be so shaped.

Many valve design options are possible for this device. Existing designs can be used, especially if a gear type linkage is employed. Since valve rotation range is determined by the throat and channel diameter in relation to the rotor diameter, the valve can be specifically designed to match the linkage. This is especially useful for the arm type linkage.

A flow restriction may be placed downstream of the mixing valves to simplify the selection of mixing valves, as well as their fixation to the linkage. It reduces or eliminates flow variabiltiy caused by variance in the total aperture area of the mixing valves with the mixture setting. The flow restriction should allow only as much flow as the minimum allowed by the mixture valves. This allows the use of valves of existing design, fixed to the linkage so that they fully close with ovelap (range 24), even though the midpoint mixture setting produces a minimum total aperture area. Such a flow restriction can be produced by using smaller valve 3, or it can be done with baffling in the mixing chamber, as next described for a related reason, or both.

Baffles may be used in mixing chamber 6 to prevent the flow rate from varying with the mixture setting due to hydrodynamic interference in the mixing chamber. Interference can be caused by one flow blocking the other, or by the mixing chamber walls shifting a current toward or away from the outlet depending on the valve positions. Suggested baffle configurations 7 are shown in FIG. 4. The mixing chamber should be shaped to avoid producing shifts in flow direction. The chamber wall opposite an inlet should be generally flat.

A 90 degree rotation range for each control arm is suggested, as shown on the dial of FIG. 3, which has marks to indicate the position of each arm. This dial design provides clarity and international understanding. Variations of it are shown in patent application Ser. No. 342,376, filed 4/24/89. Other dial designs are possible.

Cross flow between the cold and hot water inlets when the valve is not in use should be prevented. This could occur when open valves elsewhere on either water line cause a pressure differential between the not and cold sides. A check valve on each inlet channel, allowing flow only toward the mixing valve, will solve this. Cross flow will not occur if the mixture is set to either full hot or full cold between uses. This is less expensive than ckeck valves, but not as dependable, since it relies on the user.

PREFERRED EMBODIMENT

1. Internally as in FIG. 1.
2. Externally as in FIG. 8, with a dial as in FIG. 3.
3. Check valves as an option.

OPERATION

If warm or hot water is desired, the mixture is initially set full hot and the flow high, until hot water reaches the valve. Then the flow and mixture are moved to the desired setting. Once the preferred setting is known, the controls can be set without trial, using the reference marks. After use, the flow control is mobed to "off". The mixture control can be moved to full hot to prevent cross flow, and to be in position for next use.

I claim:

1. A device for fluid mixture and flow control, comprising:
   first and second flow control valves, each having a rotor and an outlet channel,
   said outlet channels joined into a merged outlet channel,
   a third flow control valve mounted in said merged outlet channel,
   means for linking said rotors to operate in substantially opposite phase from each other,
   a first control arm connected to said linking means, and a second cotrol arm connected to said third valve,
   said control arms pivot about a substantially common axis,
   a dial face with diametrically opposed arcuate segments of marks, said arcuate segments essentially concentric with said pivot axis, and said dial face mounted adjacent said arms.

2. The device of claim 1, wherein said linking means comprises a first gear connected to said first valve, a second gear connected to said second valve, and a third gear which engages the other two gears.

3. The device of claim 1 wherein said linking means comprises a first gear connected to said first valve, a second gear connected to said second valve and engaging said first gear, and a third gear which engages said first gear.

4. The device of claim 1 wherein said linking means comprises a first gear connected to said first valve, a second gear connected to said second valve and engaging said first gear, and a third gear which engages said second gear.

5. A device for fluid mixture and flow control, comprising:
   first, second, and third flow control valves, each having an inlet channel and an outlet channel,
   a fluid mixing chamber,
   the outlet channels of said first and second valves connected to said mixing chamber,
   the inlet channel of said third valve connected to said mixing chamber,
   means for linking said first and second valves to operate in unison, said first and second valves held in substantially opposite phase from each other by said linking means,
   a first control arm connected to said linking means,
   a second control arm connected to said third valve,
   said control arms pivot about a substantially common axis,
   a dial face with diametrically opposed arcuate segments of marks, said arcuate segments essentially concentric with said pivot axis,
   and said dial face is mounted adjacent said arms, whereby the rotational position of said arms is indicated by said marks.

6. The device of claim 5 wherein said linking means comprises a first gear connected to said first valve, a second gear connected to said second valve, and a third gear which engages the other two gears.

7. The device of claim 5 wherein said linking means comprises a first gear connected to said first valve, a second gear connected to said second valve and engaging said first gear, and a third gear which engages said first gear.

8. The device of claim 5 wherein said linking means comprises a first gear connected to said first valve, a second gear connected to said second valve and engaging said first gear, and a third gear which engages said second gear.

9. The device of claim 1 wherein said linking means comprises a first linkage arm connected to said first valve, a second linkage arm connected to said second valve, and a third linkage arm having engagement means for engaging said first and second linkage arms.

10. The device of claim 5 wherein said linking means comprises a first linkage arm connected to said first valve, a second linkage arm connected to said second valve, and a third linkage arm having engagement means for slidably engaging said first and second linkage arms.

* * * * *